US006511022B1

United States Patent
Robinson

(10) Patent No.: US 6,511,022 B1
(45) Date of Patent: Jan. 28, 2003

(54) SPACECRAFT SOLAR PANEL SPHERICAL TRICKLE CHARGER

(75) Inventor: Ernie Y Robinson, Altadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/179,787

(22) Filed: Jun. 24, 2002

(51) Int. Cl.⁷ .................................................. B64G 1/44
(52) U.S. Cl. ........................ 244/173; 136/293; 323/906
(58) Field of Search .......................... 244/173; 136/244, 136/246, 293; 323/906

(56) References Cited

U.S. PATENT DOCUMENTS 6,127,621 A * 10/2000 Simburger ................. 136/246
6,318,674 B1 * 11/2001 Simburger ............... 244/158 R
6,439,508 B1 * 8/2002 Taylor ........................ 244/159

* cited by examiner

*Primary Examiner*—J. Woodrow Eldred
(74) *Attorney, Agent, or Firm*—Derrick Michael Reid

(57) ABSTRACT

A solar power sphere having solar cells arrays is used in combination with a main solar flat panel array of a spacecraft for respectively providing omnidirectional solar power collection by the power sphere and unidirectional solar power collection by the main flat panels. The power sphere effectively provides trickle charging power for charging backup batteries and for providing trickle power when the main flat panel solar array is edge wise incident to solar illuminations when the main flat panel solar array does not collect any power, so that the power sphere collects power sufficient to recover and operate the spacecraft until the main solar flat panels again collect sufficient energy.

10 Claims, 3 Drawing Sheets

DEPLOYED POWER SPHERE SPACECRAFT

DEPLOYED POWER SPHERE SPACECRAFT

STOWED POWER SPHERE SPACECRAFT

DEPLOYED BALLOON POWER SPHERE SPACECRAFT

RELEASED FLAT PANEL POWER SPHERE

DEPLOYED FLAT PANEL POWER SPHERE

SPACECRAFT SOLAR PANEL SPHERICAL TRICKLE CHARGER

FIELD OF THE INVENTION

The invention relates to the field of space-based solar cell panels. More particularly, the present invention relates to a continuous trickle charging power sphere for providing attitude insensitive trickle power to a spacecraft having an attitude-oriented solar panel.

BACKGROUND OF THE INVENTION

Many on-orbit spacecraft use flat solar panels for collecting solar power to operate the spacecraft. The solar panels may be large in size relative to spacecraft payload. The solar panels are flat panels that are unfurled or unfolded for exposing the flat solar array surfaces to the sun so that incident solar illumination is orthogonal to the plane of the solar panel for maximum solar power collection. When the solar panels are oriented off normal, so that the plane of the solar panel is no longer orthogonal to incident solar rays, then less than maximum solar power is collected. Worst still, when the solar panels are incidentally aligned to the incident solar light, that is, when striking the edge of the solar panel, no solar power is collected. When no solar power is collected, on board batteries provide backup power until the solar panels are again oriented to collect sufficient solar power to power the spacecraft. Hence, solar panels are disadvantageously susceptible to loss of power collection when edge wise oriented when incidentally aligned to solar light rays.

A spacecraft may suffer from environmental or operational disturbances that cause the attitude control system to malfunction, or otherwise cause the flat solar panels to lose lock on solar power collection. Under proper attitude control, a solar panel can be positioned orthogonal to unidirectional sun illumination for maximum collection of solar power. Attitude control of a spacecraft requires backup power when there is no solar power collection, when the solar panels are incidentally aligned. The loss of lock of solar power collection will drain backup battery power supplies unless lock is quickly regained. With loss of lock and with drained battery power supplies, the spacecraft may become completely dysfunctional and be lost in space. Hence, there then exists a lock up condition, which though the solar panels are functioning correctly, incidentally aligned solar panels cannot be oriented towards the sun in the presence of completely drained backup power. As a result, a number of satellites have been lost to space because the orthogonal orientation of the solar panels to incident sun light was lost for various reasons and after backup batteries power was completely drained and the satellites became a total loss. The loss of spacecraft is a significant problem to further space exploration. Some examples of loss satellites due to loss of solar power collection are the Lewis satellite that was lost in 1997, the Terrier satellite that was lost in 1999, and the Alexis satellite that was lost in 1993. The recurring loss of space satellites due to improperly aligned main solar panel orientation represents significant economic loss.

To solve the problems of solar panel orientation malfunctioning and the required attitude control for orthogonally orienting the solar panels away from sun illumination, a power sphere was invented, as described in the U.S. Pat. No. 6,127,621 issued on Oct. 03, 2000. The power sphere comprises a plurality of small flat panels arranged to approximate a spherical shape. The small flat panels are unfurled from supporting struts to form the approximate shape of a sphere. As such, the power sphere has omnidirectional facing panels that collect sun radiation regardless of the attitude of the power sphere, and hence, there is a lack of required attitude control and there is an inherent prevention of solar panel orientation malfunctioning. The small flat panels are suitable for powering, at all times of solar radiation, small microsatellites and picosatellites requiring relative small amounts of power, but the small flat panels have relatively small surface areas and are unsuitable for powering large spacecraft having large power requirements. These and other disadvantages are solved or reduced using the invention.

SUMMARY OF THE INVENTION

An object of the invention is to provide omnidirectional solar power collection system.

Another object of the invention is to provide omnidirectional solar power collection as a backup power supply for a conventional flat panel solar array in a composite solar power collection system.

Yet another object of the invention is to provide omnidirectional solar power collection power sphere as a backup power collector for a conventional flat panel solar array in a composite solar power collection system.

The invention is directed to a omnidirectional power source that is preferably a power sphere for satellite solar power backup to the main large flat solar array. The omnidirectional power source is preferably a long-term trickle charger for charging backup batteries as a supplemental power source to conventional flat solar panel arrays. The omnidirectional power source is preferably an omnidirectional power sphere. The omnidirectional power sphere is a light weight spherical solar power collector made of light weight thin film solar cells that are deployable into suitably large spheres, that do not require controlled orientation to generate backup solar power. The power sphere is installed in conjunction with conventional solar arrays on satellites as a composite solar power collection system, and deployed on-orbit to protect against solar panels lock when losing orientation toward the sun.

The invention ensures that there will be some trickle solar power available to enable communications, and therefore enable corrective action that may save the spacecraft when losing power collection from the main solar panel array. The trickle solar power sphere can be used to prevent complete draining of backup batteries. The system includes a deployable power sphere coupled to, or operating with, the main flat solar panel array. The main solar array panel and the power sphere are deployable solar collectors. Release and controlled sequences are used to deploy the power sphere and the main flat solar panel arrays. When deployed, the power sphere collects power at all times illuminated particularly when the main flat panel solar arrays lose lock on solar illuminations when edgewise aligned to solar rays when the main solar arrays do not collect power so that at all times of solar illumination, at least some trickle power from the power sphere is received, well suited for generating recovery and backup power that can be further used as trickle charging power for charging backup batteries. The power generated by the power sphere is used to trickle charge batteries of the main power systems or auxiliary batteries of an emergency system. These and other advantages will become more apparent from the following detailed description of the preferred embodiment.

DETAILED DESCRIPTION OF THE PREFERRED EMBODIMENT

Figure 1:
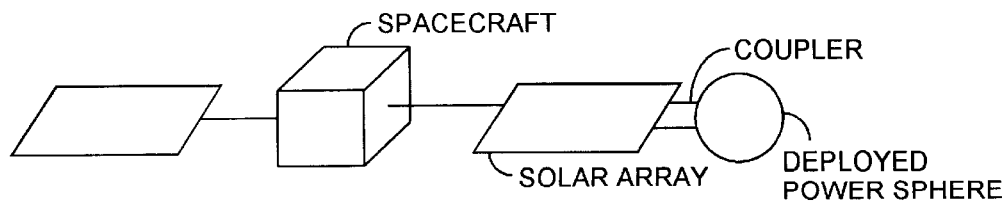
FIG. 1 is a diagram of a deployed power sphere spacecraft.
Figure 2:
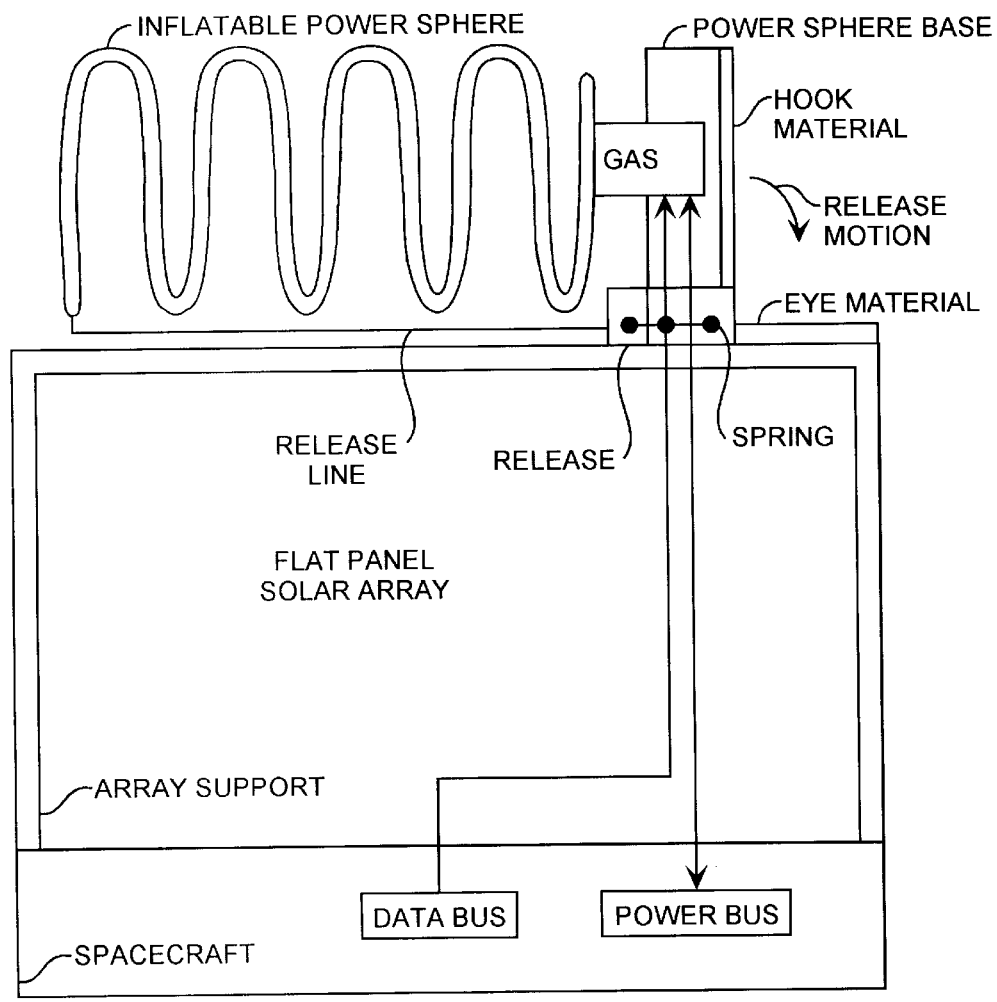
FIG. 2 is a diagram of a stowed power sphere spacecraft.
Figure 3:
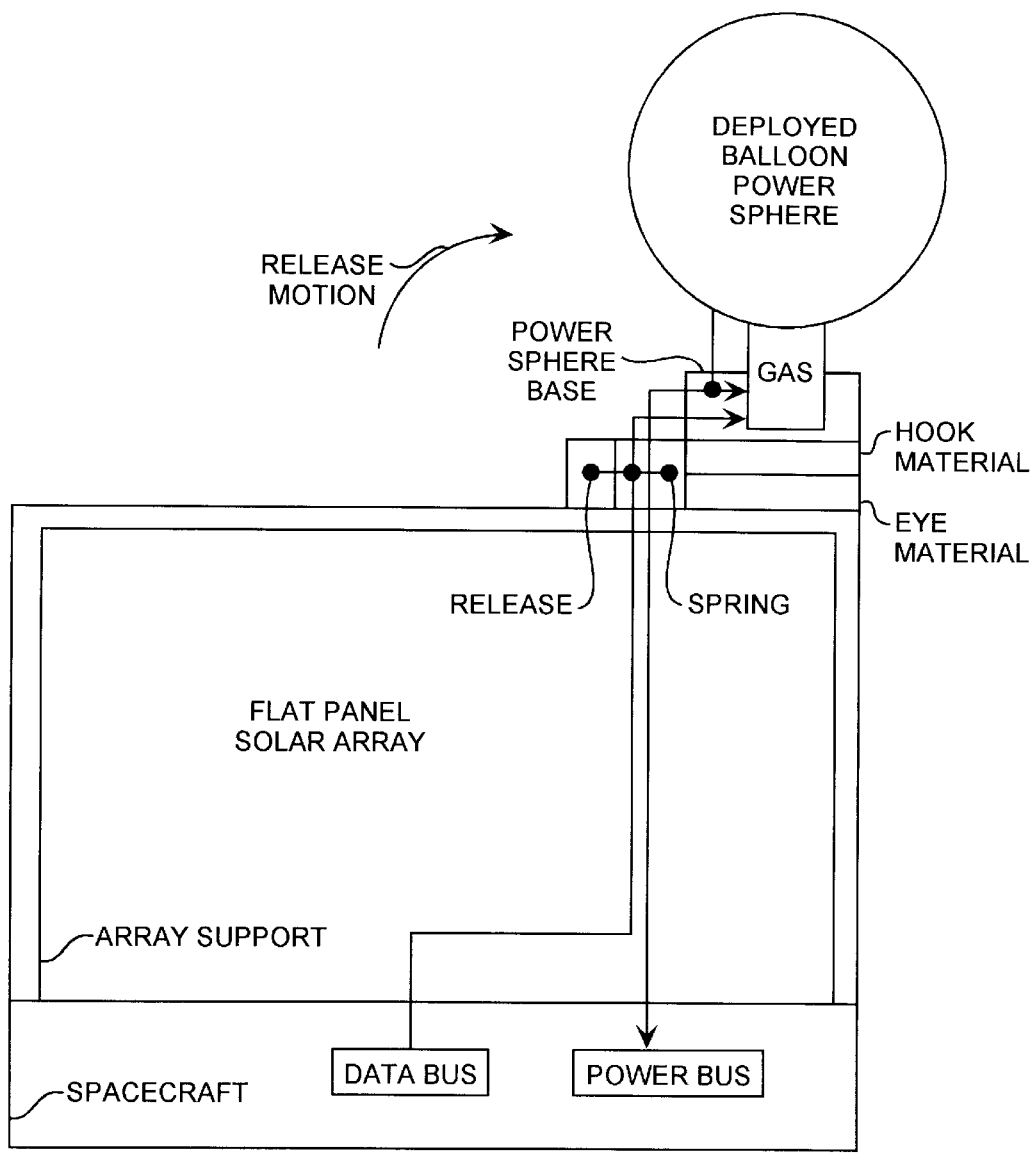
FIG. 3 is a diagram of a deployed balloon power sphere spacecraft.

An embodiment of the invention is described with reference to the figures using reference designations as shown in the figures. Referring to FIGS. 1 through 3, a spacecraft includes a flat solar array coupled to a deployed power sphere through a coupler. The coupler is a coupling means for coupling the deployed power sphere to the spacecraft. In the preferred form, the power sphere is attached to an end of the flat panel so as to extend the power sphere from the spacecraft to expose the power sphere to maximum sun radiation. The flat panel arrays receive maximum solar power when facially oriented toward the sun. The power sphere is an omnidirectional power sphere collecting solar power whenever the sun illuminates the spacecraft. The spacecraft typically include a flat panel solar array having an array support to which is attached an inflatable power sphere. The spacecraft provides a data bus for command and control and provide a power bus for receiving collected power and for providing power necessary for operating the coupler.

In one form of the invention, the power sphere is an inflatable power sphere inflated by a gas supply. A release is used to release the inflatable power sphere when releasing a release line attached to power sphere for securing the power sphere prior to deployment. Command from the data bus can be used to activate the release. A spring is used to provide a spring loading force for moving the power sphere from a stowed position to a deployed position. Hook material and eye material can be used to secure a power sphere base to the array support. Data bus controls activate a gas supply, such as a gas canister to inflate the power sphere that inflates as a deployed balloon power sphere. Other gas supplies could be used, such as sublimation powders and microelectromechanical gas generators. The inflated deployed balloon power sphere has flexible solar panels for collecting solar power from any omnidirection.

Figure 4:
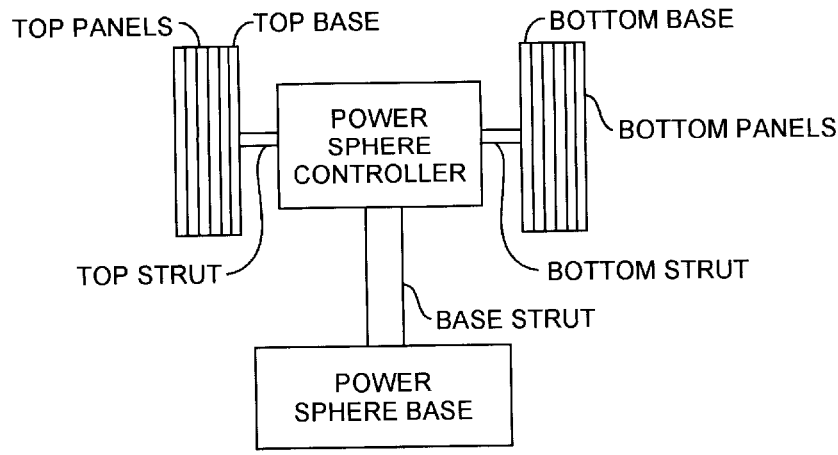
FIG. 4 is a diagram of a released flat panel power sphere.
Figure 5:
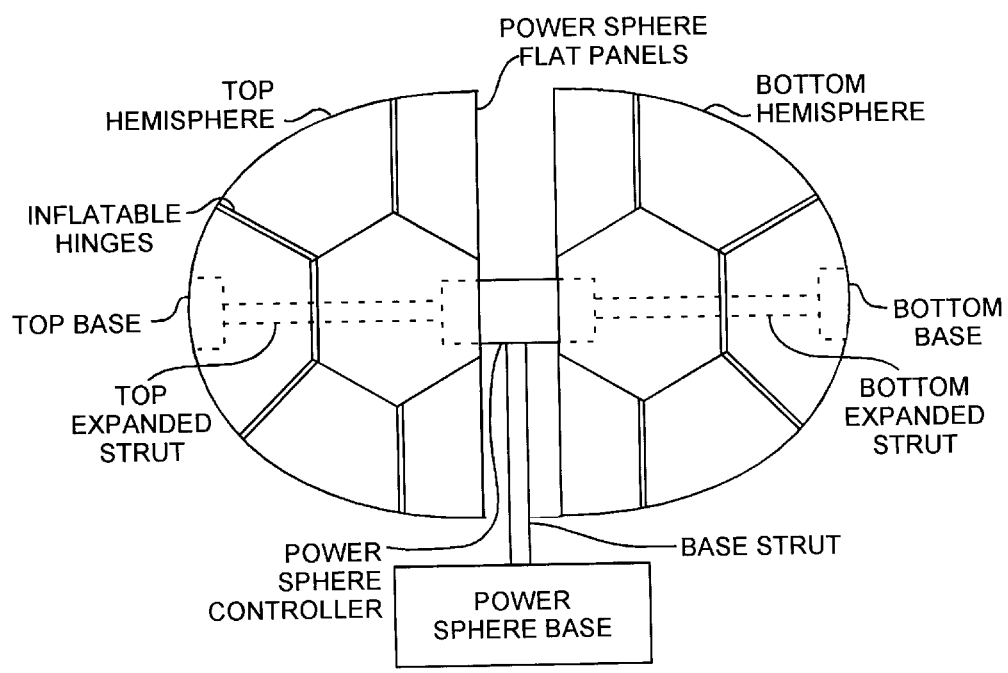
FIG. 5 is a diagram of a deployed flat panel power sphere.

The power sphere can be a flat panel power sphere, as shown in FIGS. 4 and 5. The power sphere has a power sphere base attached to the main solar panel array support. The power sphere deploys in sequence, where top and bottom struts first telescopically expand to separate top and bottom plate from each other. The top and bottom plates serve to respectively support top and bottom solar panels that deploy respective into top and bottom hemispheres of solar panels deployed into the spherical form. The panels are interconnected by inflation hinges that may be for example tubular hinges containing a sublimation powered for opening the panels unfurling in sequence into the deployed position. The top and bottom expanding struts may also contain sublimation powders for expanding the struts into the deployed position. While shown as a complete sphere of two hemispheres, the use of only one hemisphere may be useful in collecting sufficient trickle power in most attitude orientations, and hence would only collect omnidirectional solar power on only one hemisphere of the power sphere as a cost efficient implementation.

The invention is directed to a composite solar power system having main flat panel arrays and an omnidirectional power sphere that provide trickle power as long as sun illumination is present, and in this way, provides trickle power. Those skilled in the art can make enhancements, improvements, and modifications to the invention, and these enhancements, improvements, and modifications may nonetheless fall within the spirit and scope of the following claims.

What is claimed is:

1. A system for collecting solar main power and for collecting solar trickle power, the system comprising, a flat panel array having a flat surface for collecting maximum power when orthogonal to solar light, and collecting minimum power when incident to solar light, an omnidirectional solar collector for collecting power in the presence of solar illumination from any omnidirection, and a coupling means for coupling the omnidirectional solar collector to the flat panel array.

2. The system of claim 1 wherein the omnidirectional solar collector is a balloon solar power sphere.

3. The system of claim 1 wherein the omnidirectional solar collector is a balloon solar power sphere, the system further comprising, a gas supply for inflating the balloon solar power sphere.

4. The system of claim 1 wherein the omnidirectional solar collector is a power sphere having a spherical shape approximated by a plurality of solar panels.

5. The system of claim 1 wherein the omnidirectional solar collector is a power sphere having a spherical shape approximated by a plurality of solar panels, the system further comprising, inflation hinges for interconnecting the plurality of solar panels and for deploying the plurality of solar panels in sequence into a power sphere.

6. The system of claim 1 wherein the omnidirectional solar collector is a one hemisphere omnidirectional solar collector for collecting omnidirectional solar power in only one hemisphere.

7. The system of claim 1 wherein the omnidirectional solar collector comprises flat solar panels.

8. The system of claim 1 wherein the omnidirectional solar collector comprises curved solar panels.

9. The system of claim 1 wherein the omnidirectional solar collector comprises thin film flat solar panels.

10. The system of claim 1 wherein the omnidirectional solar collector comprises curved thin film solar panels.

* * * * *